US006865735B1

(12) United States Patent
Sirer et al.

(10) Patent No.: US 6,865,735 B1
(45) Date of Patent: Mar. 8, 2005

(54) PROCESS FOR REWRITING EXECUTABLE CONTENT ON A NETWORK SERVER OR DESKTOP MACHINE IN ORDER TO ENFORCE SITE SPECIFIC PROPERTIES

(75) Inventors: Emin Gun Sirer, Seattle, WA (US); Brian N. Bershad, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/168,178

(22) Filed: Oct. 7, 1998

Related U.S. Application Data

(60) Provisional application No. 60/061,387, filed on Oct. 7, 1997.

(51) Int. Cl.[7] ................................................. G06F 9/45
(52) U.S. Cl. ........................ 717/158; 717/128; 709/108; 714/38
(58) Field of Search ................................. 717/158, 128, 717/126, 127, 130, 131, 136, 140, 151, 154, 157, 159, 168; 709/108, 227; 707/10, 101; 714/38

(56) References Cited

U.S. PATENT DOCUMENTS

| 5,283,868 A | * | 2/1994 | Baker et al. ................. 709/227 |
| 5,581,749 A | * | 12/1996 | Hossain et al. ................ 705/1 |
| 5,634,098 A | * | 5/1997 | Janniro et al. ................ 714/38 |
| 5,649,203 A | * | 7/1997 | Sites ........................... 703/26 |
| 5,872,909 A | * | 2/1999 | Wilner et al. ................. 714/38 |
| 5,872,975 A | * | 2/1999 | Hedin et al. ................. 707/101 |
| 6,006,230 A | * | 12/1999 | Ludwig et al. ............... 707/10 |
| 6,112,025 A | * | 8/2000 | Mulchandani et al. ...... 709/331 |

* cited by examiner

*Primary Examiner*—Antony Nguyen-Ba
(74) *Attorney, Agent, or Firm*—Ronald M. Anderson

(57) ABSTRACT

A program or program snippet is rewritten to conform to site-specific properties prior to being executed by a target host. The program or program snippet directed to a target host from a known or unknown source is either intercepted by a server before reaching the target host or can be redirected from the target host to the server to effect its rewriting. The program is parsed in its external representation, converting it to an internal representation that is inspected and analyzed with reference to a site-specific properties database. A summary of the program's properties is then compared to the site-specific properties database by a binary rewriting engine, which produces a rewritten program in an internal representation. If appropriate, the program or program snippet is rewritten to convert it to a format suitable for execution on the target host. Furthermore, certifications may be added to the rewritten program to mark that the rewritten program obeys site-specific constraints. The rewriting service thus produces a program in an appropriate target representation that conforms to site-specific properties. These properties may relate to security, auditing, optimization, monitoring, threading, and/or management of the rewritten program.

49 Claims, 4 Drawing Sheets

PROCESS FOR REWRITING EXECUTABLE CONTENT ON A NETWORK SERVER OR DESKTOP MACHINE IN ORDER TO ENFORCE SITE SPECIFIC PROPERTIES

This application is a continuation-in-part of U.S. provisional patent application, Ser. No. 60/061,387, filed Oct. 7, 1997, the benefit of the filing date of which is hereby claimed under 35 U.S.C. 119(e) and 120.

FIELD OF THE INVENTION

The present invention generally pertains to a method and system for managing computer program execution to enable program monitoring and resource control, to enforce security, and to ensure compatibility, and more specifically, to a method and system in which software is rewritten and transformed before being executed on a computer so as to achieve these functions.

BACKGROUND OF THE INVENTION

The ability of individuals to freely access the Internet from computers or workstations poses fundamental problems for current state of the art computer systems. It is now possible to access data and programs from all over the world simply by opening a web page. Programs and Java™ or ActiveX™ code derived from unknown sources represent a tremendous network management and security problem for users and information systems (IS) managers. Code obtained from diverse and uncontrolled sources may violate the security and management service rules of the network on which it is executed.

On conventional systems, the execution of a program on a computer is governed only by the system services that are native to that computer. Consequently, networks of conventional systems face problems of scalability, manageability, integrity, and performance. First each conventional computer needs to have sufficient resources to support locally executing system services such as security, resource control, program monitoring, and task management. As a result, current systems place high resource demands on their client computers. Second, heterogeneous networks of conventional systems are hard to manage and administer, because there is no central point of control and it is difficult to establish uniform interfaces for remote management. Third, native services that are performed locally on client computers are vulnerable to security attacks and require that all client computers within a network be physically and virtually secured, which is a difficult and costly undertaking. Finally, executing services locally on client computers extracts a performance cost from the clients.

Clearly, a technique that provides greater latitude in controlling and managing software components and the behavior of applications within a network would provide a valuable advance over the current state of the art. This capability should be applicable to executable code that comes from both known and unknown sites. The method that is used should preferably examine any program as it enters the environment and before it is executed, breaking the application down into its constituent components. Those components should then be rewritten as necessary so that when the application is executed, it conforms to the security and management policy rules of the site. The management policies that might be implemented in a rewritten application can include, for example, performance tracking, usage metering, and revocable authorization to access services, or other elements of the computer/network. Moreover, the rewriting of the application components must be accomplished without altering the overall functionality of the program.

There is another important use for a technique that enables programs entering an environment to be observed, controlled, and managed prior to their execution. This technique can also be employed to retarget a program that has been developed for one machine (virtual or actual) architecture, so that the program runs on an entirely different machine architecture. Ideally, the translation and retargeting should be capable of implementation in a batch mode and be implemented with little or no user interaction. Such translation and retargeting is likely to become increasingly important to the computing world, to accommodate the ever increasing diversity of networks and machine architectures.

The techniques to accomplish the above-described functions are currently unavailable in the prior art. Accordingly, there is a clear need to develop and implement such capabilities, which has led to the present invention being developed.

SUMMARY OF THE INVENTION

In accord with the present invention, a method for modifying executable code received by a computer prior to its execution is defined. The method begins with the step of providing data that indicate how the executable code should be modified, if at all. In accordance with the data, the executable code is modified, producing modified executable code. This modified executable code is then made available for execution by the computer.

In one form of the present invention, the data define steps for modifying the executable code to enable monitoring and tracing during its execution. The method may then also include the step of storing information related to the monitoring and the tracing in either a local storage memory or a remote storage memory.

In another embodiment, the data define steps for ensuring the security of the computer and/or auditing the execution of the modified executable code by producing an audit trail.

If the modified executable code relates to sensitive information, the step of ensuring the security of the computer includes the steps of modifying the executable code to identify and store an indicator of a sensitivity of the sensitive information, enabling the sensitivity to be subsequently checked.

The data may define steps for optimizing the executable code to enable it to run faster, with less processing overhead. Or, the data may define steps for determining a threading behavior of the modified executable code, so that when the modified executable code is executed by the computer, it correctly performs context switches.

In another embodiment, the data define memory management operations, providing explicit memory management capabilities to the modified executable code that may not be provided in the executable code before modification.

In one form of the invention, the computer is a client connected to a server in a network. In this case, the step of changing the executable code is implemented by the server. The client then preferably implements the step of determining whether the executable code must be modified, and the method further comprises the step of transferring the program to the server to enable the server to apply the changes to the program to produce the modified program.

It is also contemplated that the data may define limits on either the number of system operations or the frequency with which the system operations are performed by the program, to limit denial of service attacks.

The step of determining whether the executable code must be modified preferably includes the step of parsing the program to analyze code contained therein, to determine if any of the code meets criteria for changes indicated in the file.

If the executable code is written for execution on a target platform that is different than that used by the computer, the method further includes the step of translating the executable code so that the modified executable code is executable on a software platform used by the computer.

Another aspect of the present invention is directed at apparatus that enables modifying a program that has been received, prior to executing the program. The apparatus includes a memory in which machine language instructions and criteria for changing the program are stored. A processor is included to execute the machine language instructions stored in the memory, causing the processor to implement a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Figure 1A:
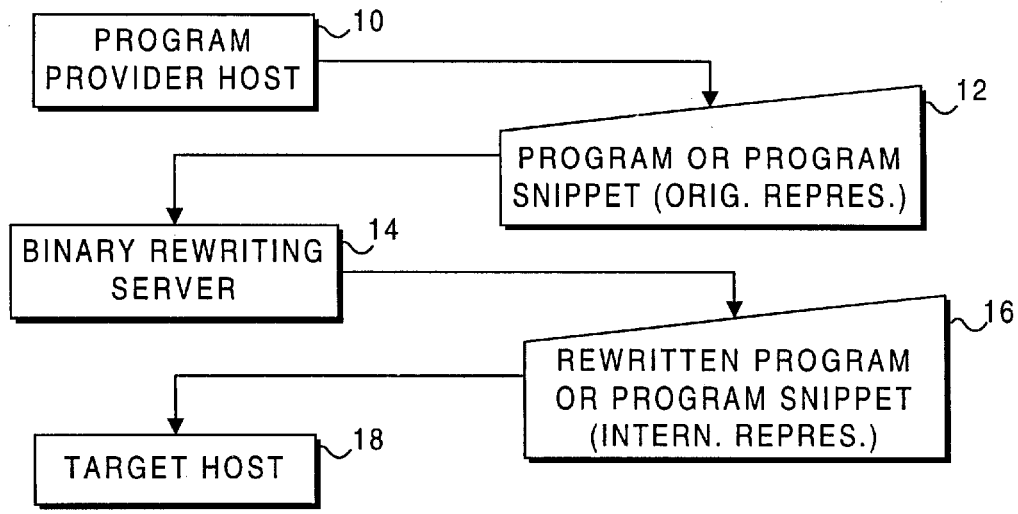
FIG. 1A is a general block diagram illustrating the functional components of a first embodiment of the present invention.
Figure 1B:
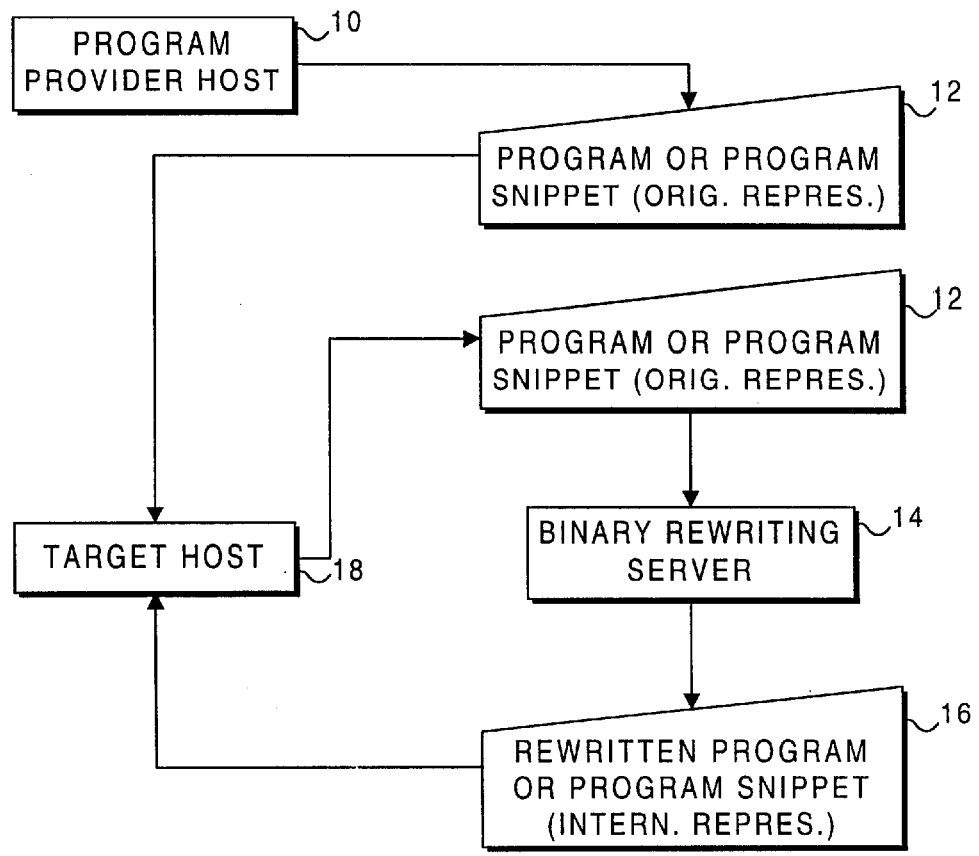
FIG. 1B is a general block diagram illustrating the functional components of a second embodiment of the present invention.

With reference to FIGS. 1A and 1B, two exemplary embodiments of the present invention are illustrated. In FIG. 1A, a program provider host 10 provides a program or program snippet 12 (in an original representation) to a target host 18. For example, the program provider host might be a server at a remote site to which target host 18 is connected over the Internet, or may be another computer, located at a remote site, and communicating with the target host over a wide area network. Indeed, the program provider host may simply be another computer at the local site, which is connected to the target host over a local area network. However, it is presumed that program provider host 10 is an untrusted source, and that program or program snippet 12 may not conform to the security policies or other criteria applied to programs implemented by target host 18. Alternatively (or in addition), program or program snippet 12 may be written for a target platform or architecture that is different than that employed by target host 18. It should be noted that as used in the claims that follow, the term "program" is intended to encompass the term "program snippet" as used in this disclosure.

Implicit in the embodiment shown in FIG. 1A is a local server (not shown) that keeps track of program transfers from untrusted sources, such as program provider host 10, to target host 18 by virtue of being logically disposed on the network between target host 18 and program provider host 10. For example, the server may be a proxy, a forwarder, may implement a firewall, or may be on a gateway or control a router through which program or program snippet 12 is directed to target host 18. Before the program or program snippet provided by program provider host 10 can be run by target host 18, the server directs it to a binary rewriting server 14, which produces a rewritten program or program snippet 16 (having an internal representation). This rewritten program is then made available to target host 18 for execution. It is contemplated that the binary rewriting server and the target host may be the same computer. Binary rewriting server 14 rewrites the original program or program snippet to include any changes required to make program or program snippet 12 conform to the site-specific properties of programs executed by target host 18. Alternatively, the changes introduced by binary rewriting server 14 may enable the program or program snippet originally written to execute on a different target platform or architecture to be executable on that employed by target host 18. For example, code written to execute under Java may be rewritten and retargeted to execute on an ActiveX platform. It is also contemplated that code written to execute on one processor might be rewritten to execute on a different type of processor using the present invention.

By placing the server between the target host and the program provider host, the number of data transfers necessary to provide the program or program snippet to the binary rewriting service are reduced in the embodiment of FIG. 1A. In contrast, FIG. 1B illustrates a different embodiment in which target host 18 is configured to send all programs or program snippets that it receives, which are of unknown or untrusted nature, through binary rewriting server 14 for approval, and as necessary, for rewriting. Binary rewriting server 14 thus has access to the program or program snippet in its original representation as provided by program provider host 10, just as in the embodiment shown in FIG. 1A. Further, binary rewriting server 14 makes the same types of changes to the program or program snippet in the embodiment shown in FIG. 1B as in the embodiment illustrated in FIG. 1A. As a result of making these changes, the binary rewriting server produces a modified or rewritten program or program snippet 16 having the desired or appropriate internal representation for execution by target host 18. This rewritten program meets site-specific constraints in connection with security, access constraints, and/or appropriate platform formatting.

Figure 2:
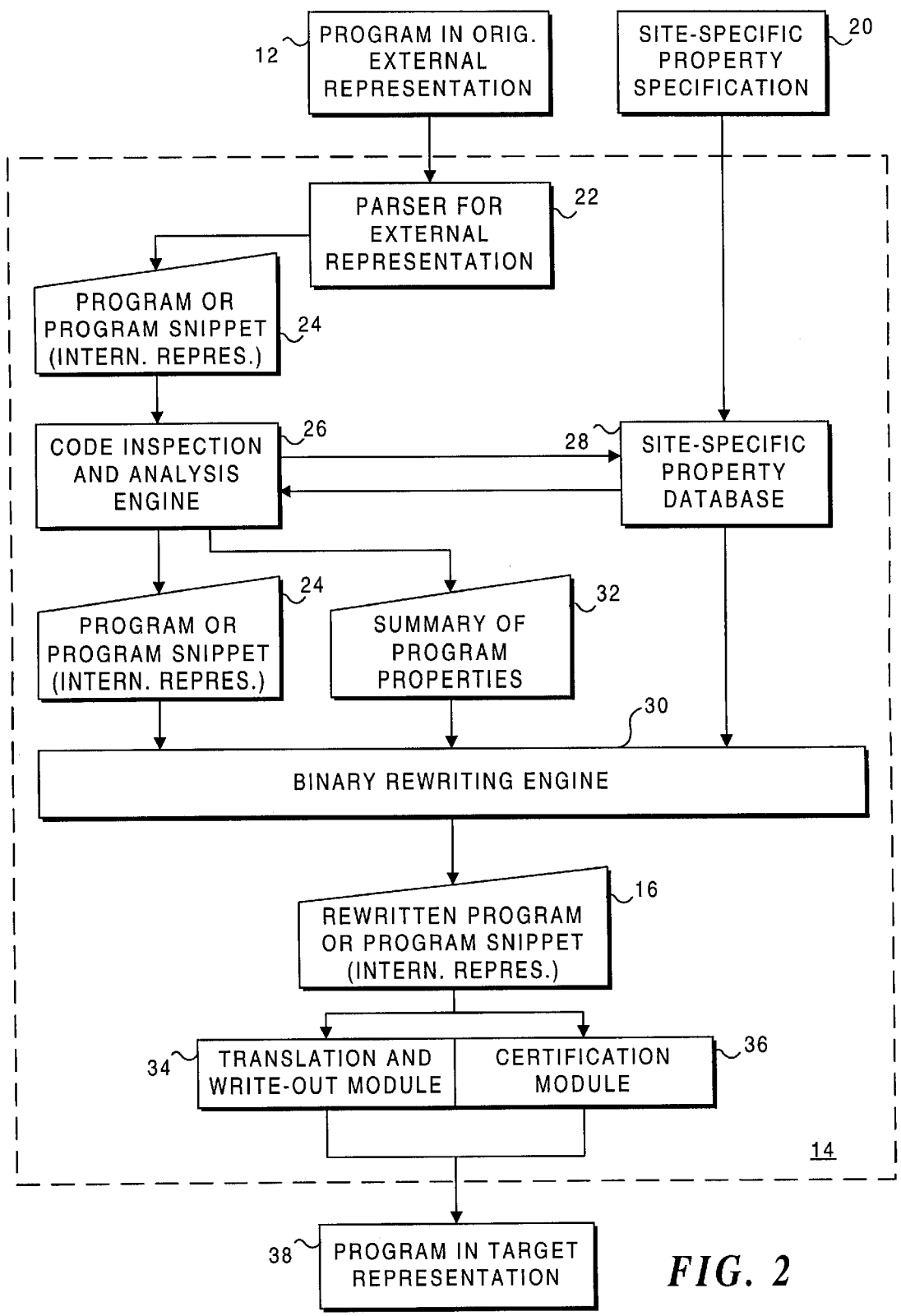
FIG. 2 is a more detailed block diagram showing functional components of the binary rewriting server of FIGS. 1A and 1B (which can be implemented on the same computer that runs the rewritten software)

FIG. 2 illustrates further details of the functions performed by binary rewriting server 14. As noted previously, the program or program snippet 12 (in the original external representation) is input to the binary rewriting server. A block 22 in FIG. 2 indicates that the input code is parsed in its external representation form, as originally provided. This external format might be in the form of a Java bytecode or ActiveX component. A parser produces a program or program snippet 24 in an internal representation that typically comprises a set of rich data structures. Translation into the internal representation simplifies the design of components of the binary rewriting server and facilitates implementation of the code analysis and rewriting function. The internal representation of the program or program snippet is input to a code inspection and analysis engine 26, which examines the codes comprising the internal representation of the program or program snippet for conformance with site-specific properties that are contained within a site-specific properties database 28. The site-specific properties database includes data that have been previously independently set forth in a site-specific property specification 20. Storage of the site-specific property specification in site-specific properties database 28 facilitates queries of the data by code inspection and analysis engine 26 to determine pertinent changes that should be made to the program or program snippet that is being inspected and analyzed. The code inspection and analysis engine extracts a summary of program properties 32 for the program or program snippet being analyzed for use in guiding a binary rewriting engine 30. As an example, the summary of program properties for a Java applet may include the bounds of code regions, methods invoked on system resources, and/or types of resources manipulated by the program or program snippet. For purposes of optimization, code inspection and analysis engine 26 can consult with the site-specific properties database and omit gathering the summary information for those properties of the program or program snippet that do not appear in the database and therefore need not be enforced.

Binary rewriting engine 30 determines the set of properties to be enforced on the program by consulting site-specific properties database 28. It performs a lookup based on the characteristics of the target host (and/or of the user) and an identifier for the program being instrumented, such as its digital hash, name, and/or origin. Thereafter, the binary rewriting engine compares the properties required of the program or program snippet against summary of program properties 32 and determines each place in the instruction stream for the program or program snippet where the desired properties obtained from the site-specific properties database may be violated. The binary rewriting engine then inserts appropriate enforcement code at or before each such location in the program or program snippet. The nature of the code that is added, e.g., for enforcement, depends upon the property that is being addressed, which may be specified in the site-specific properties database. Alternatively, the code that is added to the program or program snippet may be generated internally by binary rewriting engine 30.

For example, if the site-specific properties database indicates that a program destined to be executed on a real time system should yield its usage of the processor after a maximum of N consecutive instructions, binary rewriting engine 30 would insert a call to a system yield routine for each execution path of N instructions. Further, the instruction sequence that is inserted into the program or program snippet may be derived from the site-specific properties database, or may be hard-coded, or deduced by binary rewriting engine 30. Other examples of properties and the mechanism used for enforcing requirements of a site when the program or program snippet is executed are discussed below.

Binary rewriting engine 30 produces rewritten program or program snippet 16 (in the internal representation), which includes any code additions made by the binary rewriting engine. A block 34 provides for the translation and writing of the rewritten program or program snippet from the internal representation to the representation of the program suitable for execution on the target, as indicated in a block 38. The choice of the representation or format of the program provided in block 38 depends upon the system that is running upon the target host. Since the preferred embodiment of the present invention ensures that the rewritten program provided in block 38 is inherently self-protecting, the target representation need not be amenable to security examinations. Accordingly, rewriting an original representation that was provided in Java to a target representation in ActiveX has the advantage of assuring the security properties provided by the Java runtime are maintained, while taking advantage of a substantially lower overhead and higher performance provided by the ActiveX translation of the code originally provided to the binary rewriting server. In addition, rewriting from the original representation back to the same representation enables transparent insertion of security checks and other provisions as set forth in site-specific properties database 28.

Once the rewriting has been performed, the binary rewriting engine may also attach a certificate of approval, as implied by certification module 36. The certificate of approval attached to the final, self-protecting code by certification module 36 is not necessary if the connection between the server and the target host is secure (e.g., if both reside on the same desktop and communicate via a secure channel). Depending upon the modes of attack anticipated against an internal network, the certification scheme may range from a simple source authentication that is based on addresses in the code, to a more sophisticated tamper-proof certificate.

Once the rewritten code, and/or translated code, reaches the target host, the properties specified in the site-specific properties database are either assured statically, or will be dynamically self-assured by the modified or rewritten program, during its execution. Therefore, it is not necessary for the target host to perform any further checking or enforcement of properties specified in the site-specific properties database, since all necessary changes to meet the criteria of the site-specific properties database will have already been added to the modified or rewritten program or program snippet.

Figure 3:
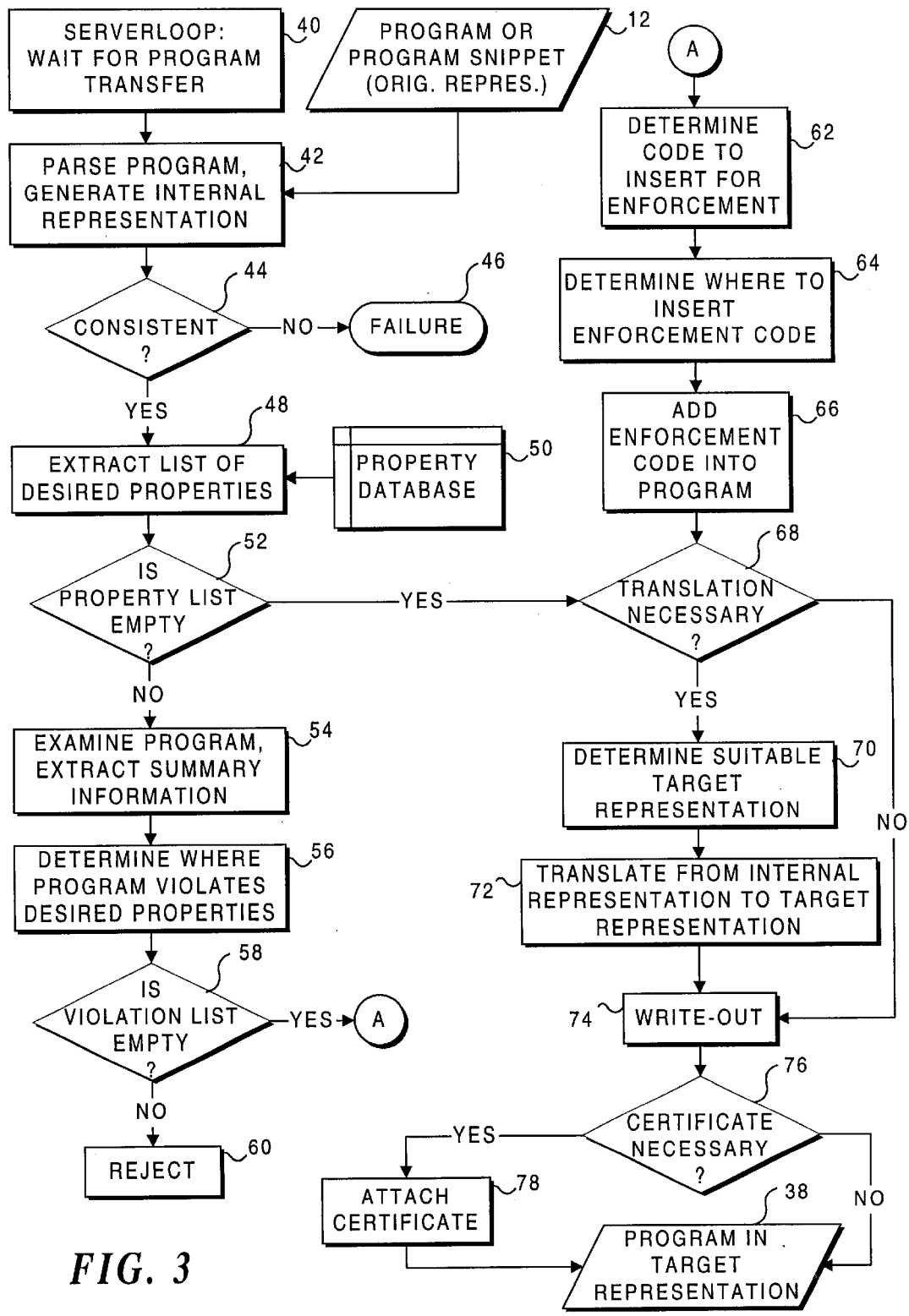
FIG. 3 is a flow chart illustrating the logic implemented in modifying or rewriting a program in accord with the present invention.

FIG. 3 provides further details of the logic implemented during rewriting of a program or program snippet 12. A block 40 indicates that a server operates in a looping mode, waiting for a program or program snippet to be transferred to or otherwise directed at the target host for execution. Upon detecting program or program snippet 12 in its original representation, the server parses the program or program snippet, generating an internal representation of it as indicated in a block 42. A decision block 44 determines if the internal representation of the program or program snippet is consistent. If not, a block 46 indicates that the attempt to parse the program has failed, which would preclude the program input to the rewriting system from being executed on the target host. However, assuming that the attempt to parse the program and generate an internal representation of the code succeeds, a block 48 provides that a list of the desired properties is extracted from the program or program snippet, based upon a comparison with the properties in the site-specific properties database as indicated in a block 50.

A decision block 52 then determines if the property list is empty, which would only occur if the program that was input satisfies all the site-specific properties. If not, a block 54 examines the program and extracts the summary information. Next, a block 56 provides for determining where the program or program snippet violates the desired properties indicated in the properties database (if any). For example, if the program or program snippet attempts to access objects for which it does not have permissions, it is likely to violate the desired properties relating to access of those objects.

A decision block 58 determines if the violation list output from block 56 is empty, and if not, a block 60 rejects further execution of the program, since it cannot be modified to satisfy the site-specific properties. Conversely, if the violation list is empty, the logic continues with a block 62. In block 62, the logic determines the code that is necessary to be inserted into the program or program snippet to enforce the properties that are specific to the site. In addition, a block 64 determines where the enforcement code should be inserted within the program so that in a block 66, the enforcement code can be added.

If decision block 52 has a property list that is empty, and also, after block 66 is executed, a decision block 68 determines if the program must be translated to execute on the target host. If so, a block 70 determines a suitable target representation for the code comprising the program. Next, a block 72 translates the code from its internal representation (corresponding to the form in which it was input) to an appropriate representation suitable to be executed by the target host. Thereafter, a block 74 provides for writing out the translated code output from block 72. Also, if no translation was necessary in decision block 68, block 74 writes out the code without translation.

A decision block 76 determines if a certificate is necessary to facilitate execution of the program. If so, a block 78 provides for attaching the certificate to the rewritten program or program snippet. Thereafter, or if no certificate is necessary, block 38 provides for output of the program in the target representation format.

EXAMPLES OF SYSTEM PROPERTIES

To illustrate the operation of the present invention for rewriting code in regard to security criteria, the following example shows how file access by an applet can be limited to only read files under the /public directory of a file system. Note that the example shows the source code, while in fact, the present invention would operate with the corresponding binary code. First, the appropriate security identifiers (SIDs) and permissions must be defined. The applet SID is used to represent applet threads, and the public-file SID is used to represent files under the /public directory. Furthermore, the fs.read permission is employed to represent the right to read files. A policy specification defines a mapping from the file system name space to these security identifiers as follows:

```
<namespace name="fs" direction="left-to-right"
    separator="/">
    <node path="/public" map="incl">
        <name>public-file</name>
    </node>
<namespace>
```

This specification defines a new namespace, called fs, whose names are interpreted from the left to the right and which uses the slash character "/" to separate path components. The namespace has one node with path /public. As indicated by the map attribute, all names in the namespace that have this path as a prefix, including the path /public itself, map to the public-file SID. It is necessary to grant applets read access to public files. Thus the fs.read tag is added to the access matrix entry for the SIDs applet and public-file (not shown). It is then necessary to define how and when the enforcement manager is invoked from applets and from the classes that provide file system access. Due to space constraints, this process is only shown for a stripped version of class java.io.FileInputStream, which provides read access to files. The specification for other relevant classes, such as java.io.FileOutputStream or java.applet.Applet is omitted. The specification for class java.io.FileInputStream and the corresponding rewritten code are as follows:

```
<class name="java.io.FileInputStream">
    <constructor name="FileInputStream(String)">
        <register for ="object" from="param" index="0"
            namespace="fs"/>
    </constructor>
    <method name="int read( )">
        <check on="object">
            <tag>fs.read</tag>
        </check>
    </method>
</class>
public class java.io.FileInputStream {
    public FileInputStream(String name) {
        EnforementManager.register(this, name, "fs");
        . . .
    }
    public int read ( ) }
        EnforcementManager.check(this, "fs.read");
        . . .
    }
}
```

The specification requires that two calls to the enforcement manager be injected into class java.io.FileInputStream. First, a register operation has to be injected into the constructor. This operation associates the new file input stream object with the SID corresponding to the String parameter in the fs namespace. Second, an access check has to be inserted into the read method. This operation verifies that the current thread has the fs.read permission on the current file input stream object. Now, whenever a new file input stream object is created, the register operation is executed. The enforcement manager queries the security policy service for the corresponding SID, providing the name argument and the fs namespace, and establishes a mapping from the object to the resulting SID. If the file input stream object represents a file under the /public directory, it will be associated with the public-file SID; if not, it will be associated with the null SID. On invocation of the read method, the access check is executed. The enforcement manager retrieves the SID for the calling thread, which is established at thread creation time and changed on protection domain transfers, and the SID for the file input stream from its security state. It then queries the security policy service for the legal permissions for this pair of SIDs and compares the result with the required permission fs.read. If the calling thread is an applet thread and the file input stream object is associated with the public-file SID, the legal permissions include the required permission and the operation is complete. If the legal permissions do not include the required permission, the enforcement manager throws a security exception in the form of a java.lang.SecurityException object and thus terminates the call to the read method.

It is not contemplated that the site-specific properties applied in rewriting a program or program snippet in any way be limited to specific sets or types of properties. Instead, it is likely that many kinds or types of properties can be enforced on the active content of a rewritten program or program snippet with the present invention. Several useful examples illustrate the types of properties that can be applied for resource management, security, and auditing. In one example, the active content of the program may be prohibited from launching a denial of service attack by limited the amount of memory that the program can allocate.

This limitation can be accomplished, for example, by inserting a code that checks before every call to a system memory allocator. Another modification to a program would prohibit attacks on virtual system resources, such as threads or windows, by limiting the number of threads or windows an applet may create or manipulate. The present invention can accomplish this modification by ensuring that any calls to thread or window create functions in the program originally input are preceded by inserted code that implements a counter increment-and-compare function. Such a modification will effectively limit the application's ability to launch denial of service attacks on virtual system resources.

It is also noted that security properties impose restrictions on a rewritten program tending to enhance or protect system integrity. For example, in current Java systems, a Java run time function is responsible for insuring that a network connection can only be initiated between an applet and its originating host. This limitation requires the run time code to perform a number of explicit, hard-coded checks. In connection with the present invention, these checks would be embedded in the code of the rewritten code by binary rewriting engine 30, thereby obviating the need to encode the security policy into the Java run time code.

As a final example of how the present invention may be used to rewrite a program, the properties specified in the site-specific properties database may take the form of auditing directives. In this case, binary rewriting engine 30 would insert hooks into the program being rewritten where calls are made to auditing functions. For example, start-stop auditing can be performed in a rewritten program using the present invention by adding a call in the program to an audit function for thread creation and deletion. Currently, implementing auditing requires the cooperation of either a system implementer or an active content provider. In contrast, use of the present invention would avoid the need for such cooperation.

Broadened Application of the Invention

The present invention enables administrators and other users of computer systems to enforce site-specific resource usage constraints, auditing requirements, security checks, and other parameters on code of both known and unknown origin. In addition, the invention permits the translation of code from one source binary format to a different binary format that is suitable for the target host to execute. While the preceding disclosure has contained a number of specific examples illustrating how the present invention can be used, this disclosure should not be construed as limiting on the scope of the invention, but rather as illustrative of how several preferred embodiments of the invention are implemented. Many other variations of the invention are contemplated, as noted below. Using the binary rewriting engine, it is possible to accomplish a number of other variations in the details of the present invention that are not specifically discussed above. These variations may optionally include or exclude certain steps that have been noted in the examples discussed above, since by adding or excluding the steps, installation requirements for a specific application of the invention can be better served, and the cost of deployment, administration, and/or implementation can be reduced.

It is contemplated that the binary rewriting service can run on replicated server computers that share server-state, load-balancing the incoming request between servers in a server pool, and providing redundancy in the face of hardware or software failures. However, smaller installations may employ a single server computer, or even on a single desktop machine for implementing the binary rewriting service, as appropriate to reduce installation costs. Furthermore, the binary rewriting server may be in the same machine as the target machine or the provider machine, thereby reducing requirements for multiple computers to carry out the present invention in very small systems.

It may be necessary for the server that implements the binary rewriting service to track the current state of the target host in order to perform its function. For instance, in the case of Java programs, the server responsible for rewriting programs may need to know about other programs that are installed on the target host. One method of implementing access to state information is for the binary rewriting server to track all changes to the target host in the persistent memory of the binary rewriting server, thereby avoiding the need to transfer the state from the target host to the binary rewriting server. While this approach reduces the communication requirements and avoids an extra protocol implementation, it introduces the problems of persistence and fault tolerance. Consequently, it is contemplated that an alternative implementation of the present invention would employ a stateless server and direct the clients to upload necessary state information to the server via a pre-established transfer protocol, as required for rewriting any incoming program snippet.

When practicing the present invention, it is likely that there would be multiple target host computers or workstations connect with a single binary rewriting server. While the above description has omitted discussion of multiple target hosts in order to reduce ambiguity, it should be apparent that each target host in a group of target hosts will behave in the manner described above in connection with the single target host shown in the drawings. The external representation format, internal processing format, and the destination representation format of the program or program snippet may all be the same, or any pair may be identical. Further, the audit trail may either be kept locally on the target host or may be transmitted over the network to a security server.

Certification may be in the form of a public-key based tamper proof certificate, or an authorization embedded in the program, or implicit (e.g., included in the network originator address). If a program or program snippet cannot be modified to conform to site-specific properties or criteria, the binary rewriting engine may send an error response to the target host. Alternatively, the server may transparently send a program which, when executed, alerts the system that includes the target host that an error has occurred. Another management service can be provided to include enterprise-wide program revocation, by which one or more server agents are used to revoke the execution rights of admitted code instantaneously if it cannot be rewritten as described above.

Computer System Suitable for Implementing the Present Invention

Figure 4:
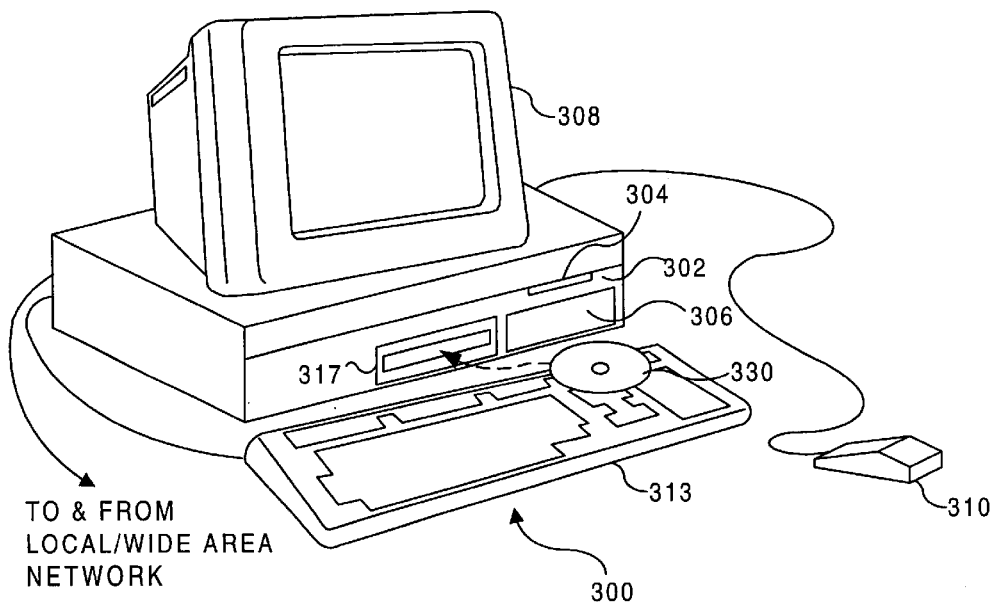
FIG. 4 is a schematic illustration of a conventional personal computer, suitable for implementing the present invention.

With reference to FIG. 4, a generally conventional personal computer 300 is illustrated, which is suitable for use in connection with practicing the present invention. Alternatively, a portable computer, or workstation coupled to a network may instead be used. The components of this personal computer are generally similar to those that would be used in each of these alternatives. The components of a server are substantially the same as those used in the personal computer shown in FIGS. 4 and 5, but a server will be provided with substantially more hard drive capacity and memory than a personal computer. Accordingly, it is unnecessary to separately show details of a workstation, portable computer, or server.

Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer. A mouse 310 (or other pointing device) is connected to a serial port (or to a bus port) on the rear of processor chassis 302, and signals from mouse 310 are conveyed to the motherboard to control a cursor on the display and to select text, menu options, and graphic components displayed on monitor 308 by software programs executing on the personal computer. In addition, a keyboard 313 is coupled to the motherboard for user entry of text and commands that affect the running of software programs executing on the personal computer.

Personal computer 300 also optionally includes a compact disk-read only memory (CD-ROM) drive 317 into which a CD-ROM disk 330 may be inserted so that executable files and data on the disk can be read for transfer into the memory and/or into storage on hard drive 306 of personal computer 300. (At this point, it should be noted that as used in this specification and in the claims that follow, the term "storage memory" includes electronic, optical, magnetic, and any other form of storage device in which data and machine instructions can be stored.) Personal computer 300 may implement the present invention in a stand-alone capacity, or may be coupled to a local area and/or wide area network as one of a plurality of such computers on the network that access one or more servers.

Figure 5:
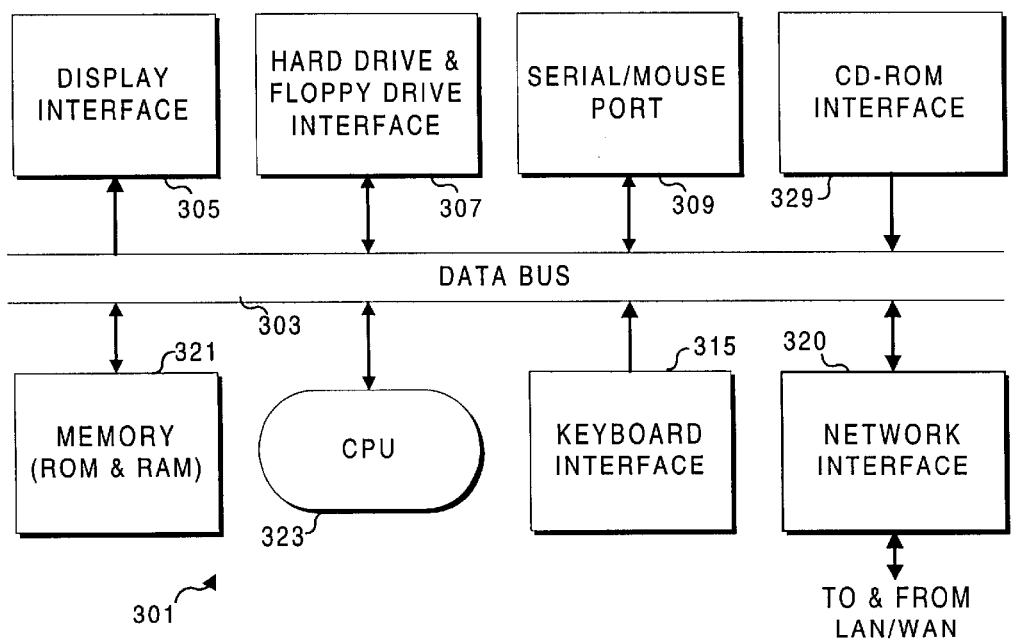
FIG. 5 is a block diagram of some of the functional components included in the personal computer of FIG. 4.

Although details relating to all of the components mounted on the motherboard or otherwise installed inside processor chassis 302 are not illustrated, FIG. 5 is a block diagram showing some of the functional components that are included. The motherboard has a data bus 303 to which these functional components are electrically connected. A display interface 305, comprising a video card, for example, generates signals in response to instructions executed by a central processing unit (CPU) 323 that are transmitted to monitor 308 so that graphics and text are displayed on the monitor. A hard drive and floppy drive interface 307 is coupled to data bus 303 to enable bi-directional flow of data and instructions between the data bus and floppy drive 304 or hard drive 306. Software programs executed by CPU 323 are typically stored on either hard drive 306, or on a floppy disk (not shown) that is inserted into floppy drive 304. The software instructions for implementing the present invention will likely be distributed either on floppy disks, or on a CD-ROM disk or some other portable memory storage medium. The machine instructions comprising the software application that implements the present invention will also be loaded into the memory of the personal computer for execution by CPU 323.

A serial/mouse port 309 (representative of the two serial ports typically provided) is also bi-directionally coupled to data bus 303, enabling signals developed by mouse 310 to be conveyed through the data bus to CPU 323. It is also contemplated that a universal serial bus (USB) port may be included and used for coupling a mouse and other peripheral devices to the data bus. A CD-ROM interface 329 connects CD-ROM drive 317 to data bus 303. The CD-ROM interface may be a small computer systems interface (SCSI) type interface or other interface appropriate for connection to and operation of CD-ROM drive 317.

A keyboard interface 315 receives signals from keyboard 313, coupling the signals to data bus 303 for transmission to CPU 323. Optionally coupled to data bus 303 is a network interface 320 (which may comprise, for example, an ETH-ERNET™ card for coupling the personal computer or workstation to a local area and/or wide area network).

When a software program such as that used to implement the present invention is executed by CPU 323, the machine instructions comprising the program that are stored on a floppy disk, a CD-ROM, a server, or on hard drive 306 are transferred into a memory 321 via data bus 303. These machine instructions are executed by CPU 323, causing it to carry out functions determined by the machine instructions. Memory 321 includes both a nonvolatile read only memory (ROM) in which machine instructions used for booting up personal computer 300 are stored, and a random access memory (RAM) in which machine instructions and data defining an array of pulse positions are temporarily stored.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for modifying executable code received by a computer prior to its execution, comprising the steps of:
   (a) providing data that indicate how the executable code should be modified, if at all;
   (b) prior to the execution of the executable code that is received, modifying the executable code in accordance with the data, to produce a modified executable code, by performing the steps of:
      (i) converting an external representation of the executable code to an internal representation;
      (ii) comparing properties of the internal representation to the data to determine which properties, if any, require modification;
      (iii) modifying the properties as indicated by the data; and
      (iv) converting the internal representation to an external representation, thereby producing the modified executable code; and
   (c) making the modified executable code available for execution by a computer.

2. The method of claim 1, wherein the data define how to modify the executable code to enable monitoring and tracing during its execution by a computer.

3. The method of claim 2, further comprising the step of storing information related to the monitoring and the tracing in one of a local storage memory and a remote storage memory.

4. The method of claim 1, wherein the data define steps for at least one of:
   (a) ensuring the security of the computer during execution of the modified executable code; and
   (b) auditing execution of the modified executable code by producing an audit trail.

5. The method of claim 4, wherein if the modified executable code relates to sensitive information, the step of ensuring the security of the computer includes the steps of modifying the executable code to identify and store an indicator of a sensitivity of the sensitive information, enabling the sensitivity to be subsequently checked.

6. The method of claim 1, wherein the data define steps for optimizing the executable code to enable the modified executable code to run faster, with less processing overhead.

7. The method of claim 1, wherein the data define steps for determining a threading behavior of the modified executable code, so that when the modified executable code is executed by the computer, the modified executable code explicitly performs context switches.

8. The method of claim 1, wherein the data define memory management operations, providing explicit memory management capabilities to the modified executable code that may not be provided therein before modification.

9. The method of claim 1, wherein the computer by which the modified executable code is to be executed is a client connected to a server in a network, and wherein the step of modifying the executable code in accordance with the data comprises the step of modifying the executable code on the server, and the step of making the modified executable code available for execution comprises the step of exporting the modified executable code from the server to the client.

10. The method of claim 9, wherein the step of modifying the executable code in accordance with the data comprises the step of receiving the executable code at the client, and further comprising the steps of:
  (a) using the client for identifying executable code resident at the client that comprises a program to be modified before execution; and
  (b) transferring the program to the server to enable the server to apply the changes to the program to produce a modified program comprising the modified executable code.

11. The method of claim 1, wherein the data define limits on either a number of system operations or a frequency with which system operations are performed by the executable code, to limit denial of service attacks.

12. The method of claim 1, wherein the step of modifying the executable code in accordance with the data comprises the step of determining whether the executable code must be modified by parsing the executable code to analyze it and to determine if any of the executable code meets criteria for changes indicated by the data.

13. The method of claim 1, wherein the executable code is written for execution on a target software platform, further comprising the step of translating the executable code so that the modified executable code is executable on a different software platform of the computer.

14. A method for enabling a server computer on a network to rewrite a program for execution by a client computer on the network, comprising the steps of:
  (a) directing the program from the client computer to the server computer for rewriting before the program is executed by the client computer;
  (b) providing data setting forth properties to be used by the server computer in modifying the program;
  (c) comparing the program with the properties in the data to identify changes to be made to the program;
  (d) rewriting the program to include the changes identified, producing a modified program; and
  (e) directing the modified program to the client computer.

15. The method of claim 14, wherein the data specify criteria for rewriting the program to enable monitoring and tracing during execution of the modified program.

16. The method of claim 15, further comprising the step of storing information related to the monitoring and the tracing in one of a local storage memory and a remote storage memory.

17. The method of claim 14, wherein the data specify how the program should be rewritten to implement at least one of:
  (a) ensuring security of at least one of the client computer, the server computer, the network, and of other client computers on the network; and
  (b) auditing execution of the modified program by producing an audit trail.

18. The method of claim 17, wherein if the modified program accesses sensitive data on the network, the step of ensuring the security of the network includes the steps of rewriting the program to identify and store an indicator of a sensitivity of the sensitive data, enabling the sensitivity to be checked.

19. The method of claim 14, wherein the data specify criteria for optimizing the program to enable the modified program to run faster on the client computer, with less processing overhead.

20. The method of claim 14, wherein the data set forth steps for determining a threading behavior of the modified program, so that when the modified program is executed by the client computer, the modified program correctly performs context switches.

21. The method of claim 14, wherein the data specify memory management operations, providing explicit memory management capabilities to the modified program that may not be provided in the program before modification.

22. The method of claim 14, wherein the data define limits on either a number of system operations or a frequency with which system operations are performed by the program, to limit denial of service attacks.

23. The method of claim 14, further comprising the step of parsing the program to analyze code contained therein, to determine if any of the code meets criteria for changes specified in the data.

24. The method of claim 14, wherein the program is written for execution on a target software platform, wherein the step of rewriting comprises the step of translating the program so that the modified program is executable on a different software platform used by the client computer.

25. A computer-readable medium having computer-executable instructions for performing a plurality of functions, including:
  (a) directing the program from the client computer to the server computer for rewriting before the program is executed by the client computer;
  (b) providing data setting forth criteria to be used by the server computer in modifying the program;
  (c) comparing the program with the criteria in the data to identify changes to be made to the program;
  (d) rewriting the program to include the changes identified, producing a modified program; and
  (e) providing the modified program to the client computer for execution thereby.

26. Apparatus that enables modifying a program that has been received, prior to executing the program, comprising:
  (a) a memory in which machine language instructions and criteria for changing the program are stored; and
  (b) a processor that executes the machine language instructions stored in the memory, causing the processor to implement a plurality of functions, including:
    (i) receiving the program;
    (ii) before the program that was received is executed, implementing the functions of:
      (1) converting an external representation of the program to an internal representation of the program, the internal representation including a set of properties;
      (2) accessing the criteria stored in the memory to compare the criteria to the properties, to determine which properties, if any, require modification;

(3) applying modifications required to the properties, in accordance with the criteria; and (4) converting the internal representation to an external representation usable by the apparatus, to produce a modified program; and (iii) enabling the modified program to be executed.

27. The apparatus of claim 26, wherein the criteria define how to modify the program to enable monitoring and tracing during its execution.

28. The apparatus of claim 27, wherein the machine instructions further cause the processor to store information related to the monitoring and the tracing in the memory.

29. The apparatus of claim 26, wherein the criteria provide for modifying the program to implement at least one of:

(a) ensuring security of a system of which the apparatus comprises at least a part; and (b) auditing execution of the modified program by producing an audit trail.

30. The apparatus of claim 29, wherein if the modified program accesses sensitive information, the machine language instructions cause the processor to modify the program to identify and store an indicator of a sensitivity of the sensitive information, enabling the sensitivity to be checked.

31. The apparatus of claim 26, wherein the criteria provide for optimizing the program to enable the modified program to run faster, with less processing overhead.

32. The apparatus of claim 26, wherein the criteria provide for determining a threading behavior of the modified program, so that when the modified program is executed, it correctly performs context switches.

33. The apparatus of claim 26, wherein the criteria define memory management operations, providing explicit memory management capabilities to the modified program that may not be provided in the program before its modification.

34. The apparatus of claim 26, wherein the processor and memory comprise a server in a computer network.

35. The apparatus of claim 34, wherein the program is transferred to the server by a client to enable the processor in the server to make the changes to the program to produce the modified program.

36. The apparatus of claim 26, wherein the machine instructions cause the processor to parse the program to analyze code contained therein, and thus, to determine if any of the code meets the criteria for changes.

37. The apparatus of claim 26, wherein the machine instructions cause the processor to define limits on either a number of system operations or a frequency with which system operations are performed by the program, to limit denial of service attacks.

38. The apparatus of claim 26, wherein the program is written for execution on a target platform, said machine instructions causing the processor to translate the program so that the modified program is executable on a different platform.

39. A method for modifying executable code received by a computer prior to its execution, comprising the steps of:

(a) providing data that indicate how the executable code should be modified, if at all, the data being available prior to the execution of the executable code;

(b) modifying the executable code in accordance with the data, to produce a modified executable code, by performing the steps of:

(i) converting an external representation of the executable code to an internal representation;

(ii) comparing properties of the internal representation to the data to determine which properties, if any, require modification;

(iii) modifying the properties as indicated by the data; and (iv) converting the internal representative to an external representation usable by a computer; and (c) making the modified executable code available for execution by a computer.

40. A method for modifying executable code received by a computer prior to its execution, comprising the steps of:

(a) providing data that indicate how the executable code should be modified, if at all;

(b) transmitting the executable code from a source to the computer;

(c) prior to executing the transmitted executable code, modifying the executable code in accordance with the data, to produce a modified executable code, by performing the steps of:

(i) converting an external representation of the executable code to an internal representation;

(ii) comparing properties of the internal representation to the data to determine which properties, if any, require modification;

(iii) modifying the properties as indicated by the data; and (iv) converting the internal representation to an external representation usable by a computer; and (d) making the modified executable code available for execution by a computer.

41. A method for modifying executable code received by a computer prior to its execution, comprising the steps of:

(a) providing data that indicate how the executable code should be modified, if at all;

(b) prior to the execution of the executable code that is received, modifying the executable code in accordance with the data, to produce a modified executable code, by performing the steps of:

(i) converting an external representation of the executable code to an internal representation;

(ii) comparing properties of the internal representation to the data to determine which properties, if any, require modification;

(iii) modifying the properties as indicated by the data; and (iv) converting the internal representation to an external representation usable by a target computer; and (c) making the modified executable code available for execution by the target computer.

42. A method for enabling a server computer on a network to rewrite a program for execution by a client computer on the network, comprising the steps of:

(a) conveying the program from the client computer to the server computer for rewriting before the program is executed by the client computer;

(b) providing data setting forth properties to be used by the server computer in rewriting the program;

(c) converting an external representation of the program to an internal representation of the program, the internal representation including a set of properties;

(d) comparing the properties of the internal representation to the data to determine which properties, if any, require modification;

(e) modifying the properties as indicated by the data;

(f) converting the internal representation to an external representation usable by the client computer, thereby rewriting the program to produce a modified program; and (g) conveying the modified program to the client computer.

43. A computer-readable medium having computer-executable instructions for performing a plurality of functions, including:
(a) obtaining a program from a client computer at a server computer for rewriting before the program is executed by the client computer;
(b) providing data setting forth criteria to be used by the server computer in rewriting the program;
(c) converting an external representation of the program to an internal representation of the program, the internal representation including a set of properties;
(d) comparing the properties to the data to determine which properties, if any, require modification;
(e) modifying the properties as indicated by the data;
(f) converting the internal representation to an external representation usable by the client computer, to rewrite the program, producing a modified program; and
(g) conveying the modified program from the server computer to the client computer for execution thereby.

44. A method for modifying executable code received by a computer prior to its execution, comprising the steps of:
(a) providing data that indicate how the executable code should be modified, if at all, to produce modified executable code, wherein the data define steps for at least one of:
(i) ensuring the security of the computer during execution of the modified executable code, such that if the modified executable code relates to sensitive information, the data define steps for modifying the executable code to identify and store an indicator of a sensitivity of the sensitive information, enabling the sensitivity to be subsequently checked; and
(ii) auditing execution of the modified executable code by producing an audit trail;
(b) prior to the execution of the executable code that is received, modifying the executable code in accordance with the data, to produce the modified executable code; and
(c) making the modified executable code available for execution by a computer.

45. A method for modifying executable code received by a computer prior to its execution, comprising the steps of:
(a) providing data that indicate how the executable code should be modified, if at all, to produce modified executable code, wherein the data define at least one of:
(i) memory management operations, providing explicit memory management capabilities to the modified executable code that may not be provided therein before modification;
(ii) limits on either a number of system operations or a frequency with which system operations are performed by the executable code, to limit denial of service attacks; and
(iii) steps for determining a threading behavior of the modified executable code, so that when the modified executable code is executed by the computer, the modified executable code explicitly performs context switches;
(b) prior to the execution of the executable code that is received, modifying the executable code in accordance with the data, to produce the modified executable code; and
(c) making the modified executable code available for execution by a computer.

46. A method for modifying executable code received by a computer prior to its execution, wherein the computer is a client connected to a server in a network, comprising the steps of:
(a) providing data that indicate how the executable code should be modified, if at all, to produce modified executable code;
(b) prior to the execution of the executable code that is received by the client, modifying the executable code on the server in accordance with the data, to produce the modified executable code; and
(c) making the modified executable code available for execution by the client, by exporting the modified executable code from the server to the client.

47. A method for modifying executable code received by a computer prior to its execution, comprising the steps of:
(a) providing data that indicate how the executable code should be modified, if at all, to produce modified executable code, wherein the executable code is written for execution on a target software platform;
(b) prior to the execution of the executable code that is received, modifying the executable code in accordance with the data, to produce the modified executable code, such that the modified executable code is executable on a different software platform; and
(c) making the modified executable code available for execution by a computer.

48. Apparatus that enables modifying a program that has been received, prior to executing the program, comprising:
(a) a memory in which machine language instructions and criteria for changing the program are stored, wherein the criteria provide for modifying the program to achieve a modified program that exhibits at least ones of the following characteristics:
(i) the modified program identifies and stores an indicator of a sensitivity of any sensitive information the modified program is configured to access, enabling the sensitivity to be checked;
(ii) the modified program limits either a number of system operations or a frequency with which system operations are performed, to limit denial of service attacks;
(iii) the modified program determines a threading behavior of itself, so that when the modified program is executed, it correctly performs context switches;
(iv) the modified program exhibits memory management capabilities that may not be provided in the program before its modification; and
(v) the modified program is executable on a different platform than a target platform for which the program was written; and
(b) a processor that executes the machine language instructions stored in the memory, causing the processor to implement a plurality of functions, including:
(i) receiving the program;
(ii) before executing the program that was received, determining whether the program is appropriate for modification;
(iii) accessing the criteria stored in the memory to determine changes to be made to the program;
(iv) applying the changes to the program in accordance with the criteria, to produce a modified program; and
(v) enabling the modified program to be executed.

49. Apparatus that enables modifying a program that has been received, prior to executing the program, comprising:
(a) a memory in which machine language instructions and criteria for changing the program are stored; and (b) a processor that executes the machine language instructions stored in the memory, the processor and memory comprising a server in a computer network, the machine language instructions causing the processor to implement a plurality of functions, including:
  (i) receiving the program;
  (ii) before executing the program that was received, determining whether the program is appropriate for modification;
  (iii) accessing the criteria stored in the memory to determine changes to be made to the program;
  (iv) applying the changes to the program in accordance with the criteria, to produce a modified program; and
  (v) enabling the modified program to be executed.

* * * * *